United States Patent [19]

Avitan

[11] Patent Number: 5,426,552
[45] Date of Patent: Jun. 20, 1995

[54] ELECTRICAL SUPPLY SAFETY SOCKET

[75] Inventor: Shimon Avitan, Fairlawn, N.J.

[73] Assignee: Aditan, Inc., Oyster Bay, N.Y.

[21] Appl. No.: 7,342

[22] Filed: Jan. 21, 1993

Related U.S. Application Data

[63] Continuation-in-part of Ser. No. 726,875, Jul. 8, 1991, abandoned.

[51] Int. Cl.⁶ .............................................. H02H 3/12
[52] U.S. Cl. ......................................... 361/42; 361/92; 307/326; 340/650
[58] Field of Search .................... 361/46, 50, 45, 9, 13, 361/42, 10, 92, 29; 307/326; 340/690

[56] References Cited

U.S. PATENT DOCUMENTS

| | | |
|---|---|---|
| 1,669,666 | 5/1928 | Laub . |
| 1,728,549 | 9/1929 | Huppert . |
| 1,912,252 | 5/1933 | Brown . |
| 2,184,359 | 12/1939 | Mueller . |
| 2,197,981 | 4/1940 | Meston . |
| 2,419,585 | 4/1947 | O'Brien et al. . |
| 2,500,474 | 3/1950 | Sperrazza . |
| 2,628,293 | 2/1953 | Williams et al. . |
| 2,735,906 | 2/1956 | Avrunn . |
| 2,789,255 | 4/1957 | Merkler . |
| 2,826,652 | 3/1958 | Piplack . |
| 2,827,523 | 3/1958 | Heuberger et al. . |
| 2,872,654 | 2/1959 | Smith . |
| 3,024,387 | 3/1962 | Nissel . |
| 3,052,770 | 9/1962 | Di Vito . |
| 3,057,975 | 10/1962 | Motten, Jr. . |
| 3,080,509 | 3/1963 | Rowe . |
| 3,171,113 | 2/1965 | McNamara . |
| 3,229,163 | 1/1966 | Rogers, Sr. . |
| 3,242,382 | 3/1966 | Rogers, Sr. . |
| 3,313,960 | 4/1967 | Borys .......................... 361/77 |
| 3,436,599 | 4/1969 | Rogers, Sr. . |
| 3,529,210 | 9/1970 | Ito et al. ......................... 361/13 |
| 3,596,019 | 7/1971 | Koester . |
| 3,627,929 | 12/1971 | Hermanus et al. . |
| 3,633,070 | 1/1972 | Vassos et al. . |
| 3,701,074 | 10/1972 | Oster . |
| 3,755,635 | 8/1973 | McGill . |
| 3,761,774 | 9/1973 | Laughinghouse . |
| 3,775,726 | 11/1973 | Gress . |
| 3,787,709 | 1/1974 | Coe . |
| 3,813,579 | 5/1974 | Doyle et al. . |
| 3,828,224 | 3/1973 | Hulshizer . |
| 3,843,854 | 10/1974 | Mori et al. . |
| 3,878,435 | 4/1975 | Van Zeeland et al. . |
| 3,895,195 | 7/1975 | Morrison et al. . |
| 3,898,528 | 8/1975 | Runtsch et al. . |
| 3,915,536 | 10/1975 | Glantz . |
| 3,922,586 | 11/1975 | Buxton et al. . |
| 3,935,509 | 1/1976 | Eidinger ......................... 361/9 |

(List continued on next page.)

FOREIGN PATENT DOCUMENTS

| | | |
|---|---|---|
| 89101425 | 12/1989 | European Pat. Off. . |
| 2547464 | 12/1984 | France . |
| 2624316 | 12/1977 | Germany . |
| 2643668 | 3/1978 | Germany . |
| 3638737 | 7/1987 | Germany . |
| 3707307A1 | 9/1988 | Germany . |
| 609500 | 2/1979 | Switzerland . |
| 8101082 | 4/1981 | WIPO . |
| 8602500 | 4/1986 | WIPO . |

OTHER PUBLICATIONS

Translation of Swiss Patent 609500 (with original); Feb. 28, 1979.

*Primary Examiner*—Todd DeBoer
*Attorney, Agent, or Firm*—McAndrews, Held & Malloy, Ltd.

[57] ABSTRACT

An electrical supply safety socket that prevents power from a mains electrical supply to be accessible at the outlets of the socket unless an electrical appliance plug is properly engaged with the socket outlets and the appliance is turned on. The electrical supply safety socket is comprised of both a safety circuit and a safety socket which may act together to accomplish the above-described safety function. The safety circuit and the safety socket may also be used independently so as to provide similar safety functions.

23 Claims, 2 Drawing Sheets

U.S. PATENT DOCUMENTS

| | | |
|---|---|---|
| 3,942,856 | 3/1976 | Mindheim . |
| 3,943,310 | 3/1976 | Gertz . |
| 3,953,689 | 4/1976 | Marrero . |
| 3,971,611 | 7/1976 | Rose . |
| 3,980,370 | 9/1976 | Gonzalez-Hernandez . |
| 3,982,084 | 9/1976 | Cooperstein . |
| 4,001,527 | 1/1977 | Hulshizer . |
| 4,002,923 | 1/1977 | Larson et al. . |
| 4,008,382 | 2/1977 | DeRosa . |
| 4,008,403 | 2/1977 | Rose . |
| 4,010,431 | 3/1977 | Virani et al. . |
| 4,010,432 | 3/1977 | Klein et al. . |
| 4,045,629 | 8/1977 | Anzani . |
| 4,054,762 | 10/1977 | Knecht . |
| 4,059,739 | 11/1977 | Girismen . |
| 4,063,299 | 12/1977 | Munroe . |
| 4,084,203 | 4/1978 | Dietz . |
| 4,093,336 | 6/1978 | Rose . |
| 4,101,805 | 7/1978 | Stone . |
| 4,148,536 | 4/1979 | Petropoulsos et al. . |
| 4,152,557 | 5/1979 | Busch . |
| 4,156,265 | 5/1979 | Rose . |
| 4,179,175 | 12/1979 | Farnworth et al. . |
| 4,185,881 | 1/1980 | Foley et al. . |
| 4,230,386 | 10/1980 | Farnworth et al. . |
| 4,271,337 | 6/1981 | Barkas . |
| 4,283,102 | 8/1981 | Richier . |
| 4,285,022 | 8/1981 | Lewiner . |
| 4,441,134 | 4/1984 | Lewiner et al. . |
| 4,456,322 | 6/1984 | Ferroni . |
| 4,459,629 | 7/1984 | Titus ................................ 361/3 |
| 4,485,282 | 11/1984 | Lee . |
| 4,568,997 | 2/1986 | Bienwald et al. . |
| 4,618,907 | 10/1986 | Leopold . |
| 4,623,209 | 11/1986 | Mangone . |
| 4,668,876 | 5/1987 | Skarman . |
| 4,816,957 | 3/1989 | Irwin . |
| 4,853,821 | 8/1989 | Lewis ................................ 361/92 |
| 4,853,823 | 8/1989 | Arechavaleta et al. . |
| 4,893,101 | 1/1990 | Robitaille . |
| 4,915,639 | 4/1990 | Cohn et al. . |
| 4,927,373 | 5/1990 | Dickie . |
| 5,019,935 | 5/1991 | Nakamura ........................ 361/45 |
| 5,029,037 | 7/1991 | Bartelink . |
| 5,030,124 | 7/1991 | Lorentzon . |
| 5,069,632 | 12/1991 | Avitan ............................... 439/188 |
| 5,112,237 | 5/1992 | Yang . |
| 5,113,045 | 5/1992 | Crofton . |
| 5,116,232 | 5/1992 | Follett . |
| 5,186,639 | 2/1993 | Comerci . |
| 5,191,499 | 5/1993 | Gaus et al. . |

Fig. 3

ELECTRICAL SUPPLY SAFETY SOCKET

CROSS-REFERENCE TO RELATED APPLICATIONS

This application is a continuation-in-part application of U.S. patent application Ser. No. 07/726,875, filed on Jul. 8, 1991, now abandoned.

BACKGROUND OF THE INVENTION

1. Field of the Invention

The present invention relates generally to electrical supply sockets and, more particularly, to an electrical supply socket that is designed to promote safety by preventing electrical power to be supplied to an appliance unless an electrical plug of the appliance is properly engaged in the socket and the appliance is turned on. A main benefit of the present invention is that it is childproof.

2. Description of the Prior Art

It is well known to provide mains electrical supply safety sockets wherein the live and neutral outlets are covered with an insulating plate which is adapted to retract when the ground pin of a three pin plug is inserted into the ground outlet of the socket. It is generally arranged in such systems for the ground pin to be slightly longer than both the neutral and live pins in order to facilitate the operation of the safety mechanism.

The major drawback with such a system is that the insulating plate is liable to jam. If it jams in the closed position the socket is unusable, and if it jams in the open position the socket is usable but the safety device is inoperative. Furthermore, such a system is not childproof in that any object having a shape resembling a ground pin may be inserted into the ground outlet of the socket, thereby retracting the insulating plate and overriding the safety mechanism. Indeed, this approach is sometimes adopted in order to connect the supply leads from an electrical appliance directly to a mains electrical supply without first attaching a plug to the appliance, which is obviously highly unsatisfactory from a safety point of view.

Other inventive efforts have been made to promote safety with respect to mains electrical supply sockets. For example, U.S. Pat. No. 4,623,209 discloses such a safety promoting electrical socket. A brief description of this prior art device is now given. U.S. Pat. No. 4,623,209 (Mangone) discloses an electrical safety socket including normally open switches for connecting live and neutral feeders to their respective socket outlets. The switches close when substantially parallel live and neutral pins of an electric plug are inserted into their corresponding socket outlets simultaneously. In such an arrangement, the insertion of each plug pin is adapted to pull a respective lever located external to the plug housing and articulated to a corresponding one of the switches. Such an arrangement allows independent operation of the switches and, since the levers are accessible from outside the plug housing, they may easily be operated independently of a plug being inserted into the socket. Consequently, foreign objects may be introduced into either socket outlet and the corresponding switch may be manually closed so as to complete the connection. Although both of the above-mentioned prior art techniques provide some degree of safety with respect to preventing an accidental or an otherwise unintentional connection to a mains electrical supply, neither prevent such a connection from occurring by anything other than simple mechanical arrangements, which are often unreliable. Thus, it would be preferable that a similar technique be provided with at least the same degree of safety as the above-mentioned prior art techniques, but also increased reliability. Such a similar technique would be desirable since it is frequently becoming a requirement to include electrical safety features in the construction of new homes, office buildings, and the like. It is therefore desirable to provide such a similar technique and to overcome the shortcomings of the above-mentioned prior art techniques in this area.

SUMMARY OF THE INVENTION

The present invention contemplates an electrical supply safety socket that prevents power from a mains electrical supply (feeders) to be accessible at the outlets of the socket unless an electrical appliance plug is properly engaged with the socket outlets and the appliance is turned on. The electrical supply safety socket is comprised of both a safety circuit and a safety socket which may act together to accomplish the above-described safety function. Thus, according to the present invention there is provided an electrical supply safety socket, comprising:

an electrical safety socket having live and neutral socket inlets and a first switching means for electrically connecting said live and neutral socket inlets to respective live and neutral socket outlets;

an electrical safety circuit having live and neutral inputs and a second switching means for electrically connecting said live and neutral inputs to respective live and neutral outputs, said live and neutral outputs being electrically connected to said live and neutral socket inlets;

the arrangement of said electrical supply safety socket being such that an appliance electrically connected across said live and neutral socket outlets is electrically connected to said live and neutral inputs by way of said first switching means and said second switching means.

It should be noted that the safety circuit and the safety socket may also be used independently so as to provide similar safety functions.

The safety circuit operates to provide several distinct, although interrelated, safety functions. The primary function of the safety circuit is, of course, to prevent power from the mains electrical supply to be accessible at the socket outlets unless an appliance plug is properly engaged with the socket outlets and the appliance is turned on. This function is accomplished by sensing whether such an appliance plug is in fact properly engaged with the socket outlets and the appliance is properly turned on. If such is the case then the safety circuit, through a series of relay connections, allows power from the mains electrical supply to be accessible at the socket outlets.

A secondary function of the safety circuit is to monitor the current balance in the power being provided by the mains electrical supply. If a current imbalance is detected, such as a short circuit from power to ground in the appliance, then the safety circuit will prevent further power from the mains electrical supply from being accessible at the socket outlets. This secondary function thus provides an additional level of safety with respect to preventing power from a mains electrical supply to be accessible at the socket outlets unless the power supplied by the mains electrical supply is current balanced.

A third function of the safety circuit is provided only after the secondary function has detected a current imbalance and power from the mains electrical supply is thereby prevented from being accessible at the socket outlets. If such is the case, the third function of the safety circuit is to maintain this preventive state until either the condition that created the current imbalance is removed or, if the appliance is still connected to the socket outlets and turned on, the appliance is turned off before being turned on again. Thus, only when the condition that created the current imbalance is cured and/or the appliance is disconnected from the socket outlets or the appliance is turned off will power from the mains electrical supply be accessible at the socket outlets.

An important safety feature is available with such operation wherein the safety circuit itself, when connected to the mains electrical supply, will shut the mains electrical supply down if an imbalance is detected in the line. This has application in preventing fires resulting from faulty wiring since the power is shut off upon the initial detection of an imbalance such as a short circuit. The safety circuit can thus be connected to lines, either directly by hard wiring or by simple plug-in connection in an outlet, to maintain safety of the line itself.

The safety socket operates to provide an additional safety feature when used in conjunction with the safety circuit. This additional safety feature is such that the live and neutral outlets maintained within the safety socket are short circuited together whenever an appliance plug is not properly engaged with the socket outlets. Of course, as previously described, the safety socket may also be used independently of the safety circuit.

From the above descriptive summary, it is thus apparent how the present invention electrical supply safety socket overcomes the shortcomings of the above-mentioned prior art techniques.

Accordingly, the primary objective of the present invention is to provide an electrical supply socket that is designed to promote safety by preventing electrical power to be supplied to an appliance unless an electrical plug of the appliance is properly engaged in the socket and the appliance is turned on.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention electrical supply safety socket, reference is now made to the appended drawings. The drawings should not be construed as limiting the present invention, but are intended to be exemplary only.

PREFERRED EMBODIMENT OF THE PRESENT INVENTION

Figure 1:
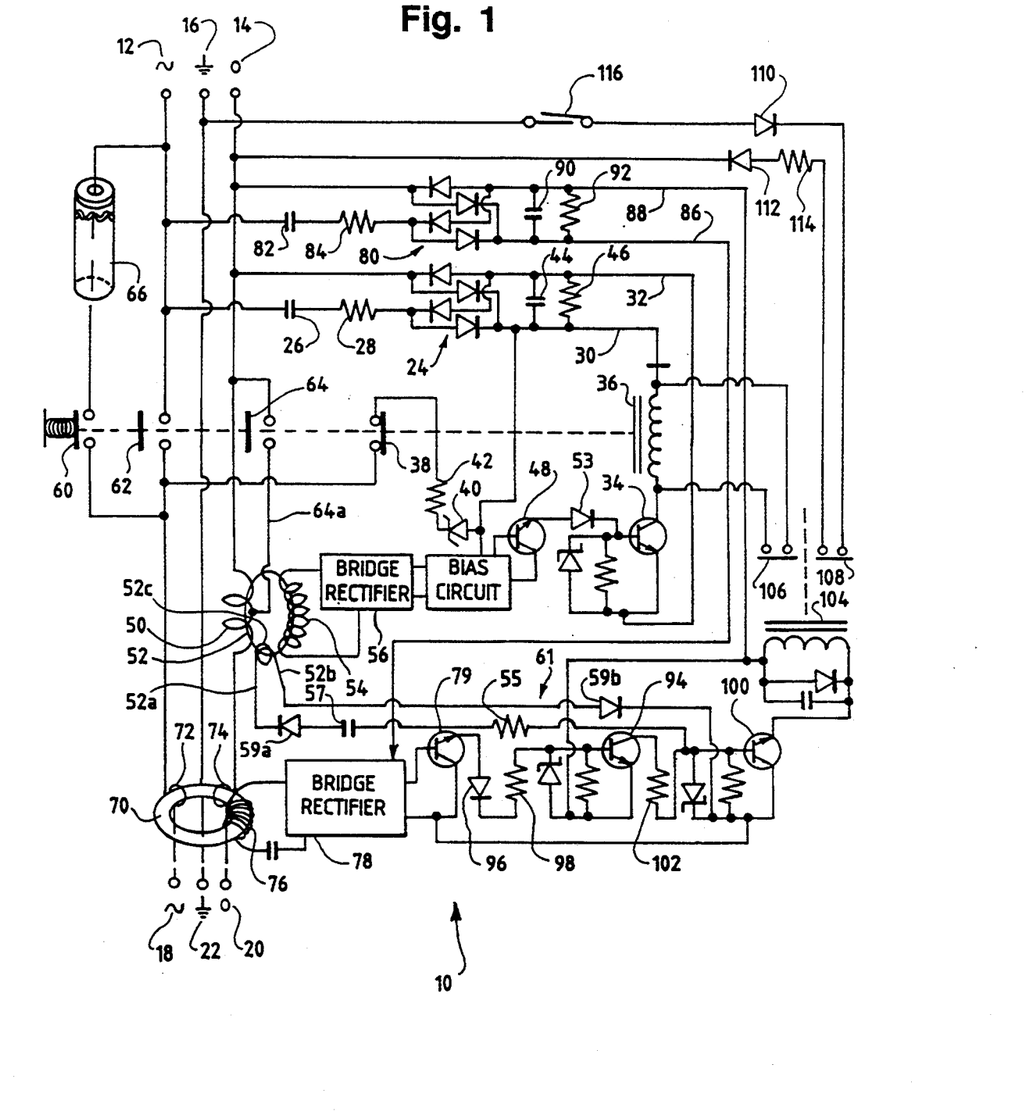
FIG. 1 is a schematic circuit diagram of a electrical supply socket safety circuit according to the present invention.

Referring to FIG. 1, there is a schematic circuit diagram of an electrical supply socket safety circuit 10 according to the present invention. The safety circuit 10 provides live 12, neutral 14, and ground 16 inputs which are connected to respective live, neutral and ground feeders (not shown). The safety circuit 10 also provides live 18, neutral 20, and ground 22 outputs which are connected to respective live, neutral, and ground socket outlets (not shown). The operation of the safety circuit 10 is such that several safety functions are performed, each of which is described as follows.

A primary function of the safety circuit 10 is to prevent power from a mains electrical supply (feeders) to be accessible at the socket outlets unless an appliance (not shown) is properly connected to the socket outlets and the appliance is turned on. To accomplish this function, a first low voltage bridge rectifier 24 is connected in series with a capacitor 26 and a resistor 28 across the live 12 and neutral 14 inputs so as to produce both a positive 30 and a negative 32 low D.C. voltage supply rail. It should be noted that the capacitor 26 and the resistor 28 serve to provide a high impedance which limits the effective A.C. voltage from the feeders across the first low voltage bridge rectifier 24, which in turn rectifies the resultant limited A.C. voltage so as to produce the low D.C. voltage across the positive 30 and negative 32 supply rails. The use of the capacitor 26 and the resistor 28 therefore obviates the need to use a transformer, which is more commonly used in conjunction with a bridge rectifier to produce a low D.C. voltage from a relatively high A.C. voltage input. Such transformers are generally bulky as compared to the capacitor 26 and the resistor 28 and, if used, would prevent the safety circuit 10 from being implemented within a standard electrical socket. The use of a transformer, in such applications, is accordingly not as desirable. In addition, the value of the capacitance selected for capacitor 26 will also serve to check whether sufficient current is being supplied to the socket. Thus, by selecting a larger capacitance for capacitor 26, a larger current supply to the socket or plug will be required to charge the capacitor 26, which in turn will permit current to be drawn from the socket only when this minimum amount of current is supplied to the socket or plug. In effect, this will serve to check all of the loads upstream of the appliance. If the appliance does not operate (because capacitor 26 is not charged), the person attempting to use the appliance will realize that the line is overloaded.

Connected in series between the positive 30 and negative 32 supply rails is a first switch transistor 34 and a variable rate relay contact solenoid 36, which provides a single normally closed relay contact 38 and three normally open relay contacts 60,62,64. When the variable rate relay contact solenoid 36 is in its de-energized state (when the appliance is not turned on and/or the appliance is not properly connected to the socket outlets), the single normally closed relay contact is closed and the three normally open relay contacts 60,62,64 are open. The closure of the single normally closed relay contact 38 allows a connection to be made, through a series connected zener diode 40 and resistor 42, between the positive supply rail 30 and the live output 18. However, when the appliance is not properly connected and turned on, or when there is otherwise an open circuit between the live output 18 and the neutral output 20, there is no current flow from the positive supply rail 30 to the live output 18, and hence no current flow back through the neutral output 20. In this situation, as will be more thoroughly described later, the first switch transistor 34 is in an off state and the variable rate relay contact solenoid 36 remains in its de-energized state. Also in this situation, the open state of the three normally open relay contacts 60,62,64 prevents any power from the mains electrical supply from being accessible at the socket outlets.

Furthermore in this situation, a storage capacitor 44 that is connected in parallel between the positive 30 and negative 32 supply rails becomes charged at a rate determined by a similarly parallel connected resistor 46. This charged storage capacitor 44 provides a positive voltage to a second switch transistor 48, which is used to bias the base of the first switch transistor 34 and thereby turn on the first switch transistor 34 when the appliance is properly connected and turned on, as will now be described.

When the appliance is properly connected and turned on, the positive supply rail 30 provides current to the live output 18 that returns through the neutral output 20 and through a first winding 50 around a first toroid 52. The current through the neutral output winding 50 creates a magnetic flux in the first toroid 52 so as to produce a current in a second winding 54 that is connected to a second low voltage bridge rectifier 56. In response thereto, the second low voltage bridge rectifier 56 produces a positive voltage to the second switch transistor 48, which causes the second switch transistor 48 to turn on. This allows the positive supply rail 30 to drive the base of the first switch transistor 34 through a series connected diode 53, thereby turning on the first switch transistor 34 and thus allowing the variable rate relay contact solenoid 36 to become energized by current passing between the positive 30 and negative 32 supply rails.

In its energized state, the variable rate relay contact solenoid 36 opens the normally closed relay contact 38 and closes the three normally open relay contacts 60,62,64 in a predetermined sequence. Normally open relay contact 60 is the first to close and provides the live input 12 with a connection to the live output 18 through a series connected, fluid-filled resistor 66. The fluid-filled resistor 66 serves to dampen the initial connection between the live feeder and the live socket output, thereby preventing sparking when the relay contact 60 is closed. A fluid filled resistor is used since such a device can tolerate large instantaneous voltage differentials without burning out. It is presently preferred that the resistor 66 is a water-filled resistor. Normally open relay contact 62 is the second to close and provides the live input 12 with a direct connection to the live output 18. Finally, the third normally open relay contact 64 will close and will provide the neutral input 14 with a direct connection to the neutral output 20 by way of a shorter tap connection 64a being made to the neutral output winding 50. This shorter tap connection may be provided to connect with a turn of the winding which complies with U. L. industry standards concerning the number of winding turns allowed in mains electrical supply lines. It should therefore be noted that the order in which the second 62 and the third 64 normally open relay contacts are closed must comply with the U. L. industry standards, such that a connection between the neutral input 14 and the neutral output 20 having a neutral output winding 50 with more than the U. L. industry standard allowed number of turns shall never carry a live mains electrical supply.

The primary function of the safety circuit 10 as described so far thus prevents power from the mains electrical supply to be accessible at the socket outlets unless the appliance is properly connected to the socket outlets and the appliance is turned on.

A secondary function of the safety circuit 10 is to monitor the current balance between the live output 18 and the neutral output 20 from the mains electrical supply, and to disconnect the mains electrical supply from the socket outlets if an imbalance is detected. To accomplish this secondary function, a second toroid 70 is provided around which a first winding 72 in the connection between the live input 12 and the live output 18 is maintained, and a second winding 74 in the connection between the neutral input 14 and the neutral output 20 is maintained. It should be noted that in order to properly monitor the current balance between the live output 18 and the neutral output 20, both of these windings 72,74 should have the same number of turns and they should be wound so as to produce opposing magnetic fluxes in the core of the second toroid 70. Thus, when the current supplied by the live output 18 and the current returned by the neutral output 20 are not equally balanced, a net magnetic flux is created in the core of the second toroid 70. The cause of such a current imbalance could be a short circuit to ground in the appliance or any number of other occurrences having a similar effect.

There is a third winding 76 around the second toroid 70 that is connected to a third low voltage bridge rectifier 78. This third low voltage bridge rectifier 78 is connected to a third switch transistor 79 in a manner similar to that of the second low voltage bridge rectifier 56 and the second switch transistor 48. Thus, when a magnetic flux is created in the second toroid 70 due to a current imbalance, the third low voltage bridge rectifier 78 produces a positive voltage the third switch transistor 79, which causes the third switch transistor 79 to turn on. The significance of this event will now be explained.

A fourth low voltage bridge rectifier 80 is connected, similar to the first low voltage bridge rectifier 24, in series with a capacitor 82 and a resistor 84 across the live 12 and neutral 14 inputs so as to produce both a positive 86 and a negative 88 low D.C. voltage supply rail. It should again be noted that the capacitor 82 and the resistor 84 serve to provide a high impedance which limits the effective A.C. voltage from the feeders across the fourth low voltage bridge rectifier 80, which in turn rectifies the resultant limited A.C. voltage so as to produce the low D.C. voltage across the positive 86 and negative 88 supply rails. Also similar to the first low voltage bridge rectifier 24, a capacitor 90 and a resistor 92 are connected in parallel across the positive 86 and negative 88 supply rails so as to provide a positive voltage to the third switch transistor 79 and to a fifth switch transistor 100, and a negative voltage to the emitter of a fourth switch transistor 94.

At this point it should be noted that a single low voltage bridge rectifier can be used to perform the functions of both the first low voltage bridge rectifier 24 and the fourth low voltage bridge rectifier 80. The first 24 and the fourth 80 low voltage bridge rectifiers are both shown here for redundancy and circuit clarity purposes.

With this in mind, when the third switch transistor 79 is turned on as a result of a current imbalance between the live output 18 and the neutral output 20, the positive supply rail 86 is allowed to drive the base of the fourth switch transistor 94 through a series connected diode 96 and resistor 98, thereby turning on the fourth switch transistor 94. In turn, when the fourth switch transistor 94 is turned on, the negative supply rail 88 is allowed to drive the base of the fifth switch transistor 100 through a series connected resistor 102, thereby turning on the fifth switch transistor 100 and allowing a normally open two-contact relay 104 to become energized by current passing between the positive 86 and negative 88 supply rails.

When the two-contact relay 104 is energized, a first normally open relay contact 106 is closed, thereby creating a short circuit connection across the variable rate relay contact solenoid 36. This short circuit connection results in the variable rate relay contact solenoid 36 being de-energized, which in turn results in the single normally closed relay contact 38 and the three normally open relay contacts 60,62,64 being placed in their respective closed and open positions. Thus, the connection between the live input 12 and the live output 18 is open circuited, thereby preventing power from the mains electrical supply from being accessible at the socket outlets.

Also when the two-contact relay 104 is energized, a second normally open relay contact 108 is closed, thereby creating a unidirectional electrical connection from the ground input 16 to the neutral input 14 by way of a pair of series connected diodes 110,112 and a series connected current protection resistor 114. This unidirectional electrical connection is provided to prevent a circuit breaker (not shown) associated with the mains electrical supply from being blown in the event that the current imbalance was caused by a short circuit to ground. It should be noted that this unidirectional electrical connection can also be made from the ground input 16 to the live input 12 or from the neutral input 14 to the live input 12. A series connected switch 116 is provided along the unidirectional electrical connection so as to make this connection user-selectable.

Connections 52a and 52b, from toroid 52, with resistor 55, capacitor 57, and diodes 59a and 59b, serve to permit energizing of two-contact relay 104, with closing of relay contacts 106 and 108, and shut-off of current, when live and neutral outputs 18 and 20 are directly short-circuited. In addition, by selecting the number of turns 52c around toroid 52 between connections 52a, 52b and/or the value of resistor 55, a wattage of a predetermined amount can be detected. For example, if it is desired to shut-off the current when more current would be drawn than established by the electrical code, the desired number of turns 52c and/or the value of the resistor 55 can be selected to detect the wattage corresponding to the maximum permitted by the code. When this maximum is exceeded, current will flow to transistor 100 through loop 61 to energize relay 104 to thus shut-off current.

The secondary function of the safety circuit 10 as described so far thus disconnects the mains electrical supply from the socket outlets if a current imbalance is detected between the live output 18 and the neutral output 20. If such a current imbalance does occur and the secondary function of the safety circuit 10 performs as required, then a third function of the safety circuit 10 is provided. This third function prevents power from the mains electrical supply to be accessible at the socket outlets after a current imbalance has been detected until either the condition that created the current imbalance is removed or, if the appliance is still connected to the socket outlets and turned on, the appliance is turned off before being turned on again. This third function is accomplished by the fact that once a current imbalance condition has been detected and the first normally open relay contact 106 is closed, thereby essentially short circuiting the positive 30 and negative 32 supply rails, the storage capacitor 44 becomes discharged and stays discharged for as long as there is a closed circuit across the live output 18 and the neutral output 20, or across the live output 18 and the ground output 22. Under either of these conditions, the second switch transistor 48 is unable to bias the base of the first switch transistor 34, thereby preventing the first switch transistor 34 from turning on and allowing the variable rate relay contact solenoid 36 to become energized. Thus, only when the condition that created the current imbalance is cured and/or the appliance is disconnected from the socket outlets or the appliance is turned off will the safety circuit 10 be in a position to allow power from the mains electrical supply to be accessible at the socket outlets.

At this point it should be noted that the discrete components shown in FIG. 1 that are not specifically identified in the above written description perform basic circuit functions which are known to those with ordinary skill in the art. Accordingly, those discrete components that are not specifically identified above are not intended to be determinative with respect to the function of the present invention.

Figures 2, 3:
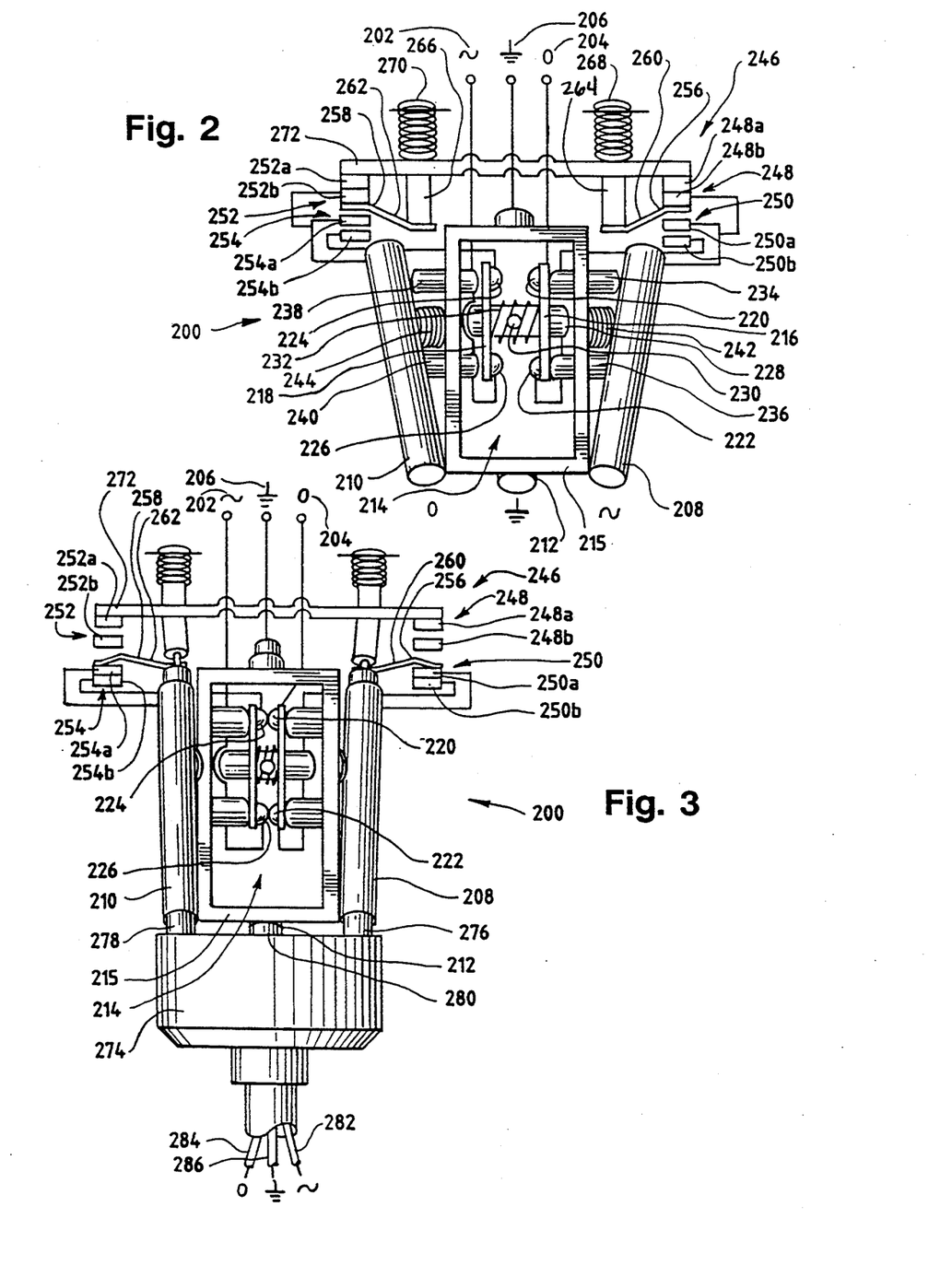
FIG. 2 is a schematic representation of an electrical supply safety socket in a non-engaged position according to the present invention.
FIG. 3 is a schematic representation of an electrical supply safety socket in an engaged position with a three prong electrical appliance plug according to the present invention.

Referring to FIG. 2, there is shown an electrical safety socket 200 according to the present invention that may be used in combination with the above described safety circuit 10. The primary components of this safety socket 200 have been previously described in U.S. Pat. No. 5,069,632, issued Dec. 3, 1991, and assigned to the assignee hereof. Accordingly, U.S. Pat. No. 5,069,632 is hereby incorporated by reference, and the following description is directed to only those aspects of the safety socket 200 which afford improved inventive features.

The safety socket 200 provides live 202, neutral 204, and ground 206 inputs that may be connected directly to the live 18, neutral 20, and ground 22 outputs shown in FIG. 1. The safety socket 200 also provides corresponding live 208, neutral 210, and ground 212 socket outlets that may be engaged with a typical three prong electrical plug (not shown). The ground input 206 is shown to be permanently connected to the ground outlet 212. Between the live 208 and neutral 210 socket outlets, however, there is a first switch assembly 214 which is arranged to assist in connecting the live input 202 to the live outlet 208 and the neutral input 204 to the neutral outlet 210 when substantially parallel electrical plug pins (not shown), inserted into both the live outlet 208 and the neutral outlet 210, move these outlets into a substantially parallel position. Both this first switch assembly 214 and the manner in which the live 208 and neutral 210 outlets are moved are exactly as described in the above-mentioned incorporated by reference patent, wherein a switch housing 215, a first armature 216, a second armature 218, a plurality of switch contacts 220,222,224,226, an armature support rod 228, an armature support rod securing pin 230, an armature spring 232, a plurality of armature abutting means 234,236,238,240, and a pair of outlet springs 242,244 are required.

The safety socket 200 also provides a second switch assembly 246 that is comprised of a plurality of switches 248,250,252,254 having a plurality of switch contacts 248a,248b,250a,250b,252a, 252b,254a,254b, respectively. The position of the switches 248,250,252,254 is controlled by a pair of insulating armatures 256,258 that are pivotally supported by a pair of pins 260,262, respectively. In turn, the position of the armatures 256,258 is controlled by a pair of armature abutting means 264,266 and a corresponding pair of recoil springs 268,270, respectively, and the actual electrical plug pins (not shown) when inserted into the live 208 and neutral 210 outlets. When the electrical plug pins are not inserted into the live 208 and neutral 210 outlets (as shown), the armature abutting means 264,266 and the corresponding recoil springs 268,270 act to move the armatures 256,258 into first respective positions about their corresponding pivot pins 260,262, thereby forcing switch contacts 248a and 248b and switch contacts 252a and 252b to be closed. It should be noted that the switch contacts 248a and 252a are secured to an electrically conducting buss bar 272 such that electrical contact is made between them.

The operation of the safety socket 200 is as follows. When the safety socket 200 is in a disengaged position (as shown in FIG. 2), the live input 202 is electrically disconnected from the live outlet 208 since the switch contacts 222 and 226 are open in the first switch assembly 214 and switch contacts 250a and 250b are open in the second switch assembly 246. Similarly, the neutral input 204 is electrically disconnected from the neutral outlet 210 since the switch contacts 220 and 224 are open in the first switch assembly 214 and switch contacts 254a and 254b are open in the second switch assembly 246. However, the live outlet 208 is electrically connected to the neutral outlet 210 since both switch contacts 248a and 248b and switch contacts 252a and 252b are closed, thereby short circuiting the live 208 and neutral 210 outlets through the electrically conducting buss bar 272. This short circuiting feature is useful for safety considerations whether the safety socket 200 is used with the above-described safety circuit 10 or when connected directly to standard mains electrical supply feeders.

Referring to FIG. 3, the safety socket 200 is shown with an electrical plug 274 engaged therewith. The plug 274 provides substantially parallel live 276, neutral 278, and ground 280 plug pins that are connected to live 282, neutral 284, and ground 286 wires, which are in turn connected to an appliance (not shown). The live 276, neutral 278, and ground 280 plug pins engage with the live 208, neutral 210, and ground 212 outlets such that the live 208 and neutral 210 outlets are moved into a substantially parallel position, thereby forcing switch contacts 220 and 224 and switch contacts 222 and 226 to be closed. Furthermore, the live 276 and neutral 278 plug pins act to move the armatures 256,258 into second respective positions about their corresponding pivot pins 260,262, thereby forcing switch contacts 250a and 250b and switch contacts 254a and 254b to be closed.

Thus, when the safety socket 200 is in an engaged position (as shown in FIG. 3), the live input 202 is electrically connected to the live outlet 208, and hence to the live wire 282 of the appliance, since the switch contacts 222 and 226 are closed in the first switch assembly 214 and switch contacts 250a and 250b are closed in the second switch assembly 246. Similarly, the neutral input 204 is electrically connected to the neutral outlet 210, and hence to the neutral wire 284 of the appliance, since the switch contacts 220 and 224 are closed in the first switch assembly 214 and switch contacts 254a and 254b are closed in the second switch assembly 246.

At this point it should be noted that the primary benefit of using the above-described safety socket 200 with the above-described safety circuit 10 is to provide an additional level of safety with respect to preventing power from a mains electrical supply to be accessible at the socket outlets unless an electrical appliance plug is properly engaged with the socket outlets. It should be further noted that both the safety socket 200 and the safety circuit 10 may be used independently of each other and may be adapted for other purposes. For example, the safety circuit 10 may be accommodated in an electrical plug assembly of an appliance.

With both the present invention safety circuit 10 and the safety socket 200 now fully described it can thus be seen that the objectives set forth above are efficiently attained and, since certain changes may be made in the above-described circuit 10 and socket 200 without departing from the scope of the present invention, it is intended that all matter contained in the above description or shown in the accompanying drawings shall be interpreted as illustrative and not in a limiting sense.

What is claimed is:

1. An electrical safety circuit for electrical connection between live and neutral supply feeders and an appliance having an ON condition which establishes a completed electrical path between the live blade and the neutral blade of the plug of the appliance, comprising:
   a live input connectable to a live supply feeder;
   a neutral input connectable to a neutral supply feeder;
   a live output connectable to the live blade of an electrical plug of an appliance;
   a neutral output connectable to the neutral blade of the electrical plug of the appliance;
   a switching circuit electrically connected between said live and neutral inputs and said live and neutral outputs, respectively, said switching circuit including a switch having (i) a normally open state in which said live and neutral inputs are disconnected from said live and neutral outputs, and (ii) a closed state in which said live and neutral inputs are connected to said live and neutral outputs, said switch being electrically activatable to said closed state;
   a first circuit for enabling said switch to said closed state when live and neutral supply feeders are electrically connected to said live and neutral inputs, respectively, and when an electrical circuit across said live and neutral outputs is completed, said electrical circuit being completed when the plug of the appliance is electrically connected across said live and neutral outputs and when said appliance is in said ON condition,
   said first circuit comprising:
   (i) a rectifier circuit connected to said live and neutral inputs, for deriving a low D.C. voltage output therefrom;
   (ii) a supply circuit connected to one of said live and neutral outputs for supplying said low D.C. voltage thereto;
   (iii) a detector circuit connected to other one of said live and neutral outputs for detecting whether a completed electrical circuit exists across said live and neutral outputs; and (iv) a switching circuit responsive to said detector circuit, for enabling said switch to its closed position when a completed electrical circuit exists across said live and neutral outputs.

2. An electrical safety circuit according to claim 1 and further including a second circuit for monitoring the current in the electrical circuit across said live and neutral outputs, and for disabling said switch to said open state when a current imbalance is detected in the electrical circuit.

3. An electrical safety circuit for electrical connection between live and neutral supply feeders and an appliance having an ON condition which establishes a completed electrical path between the live blade and the neutral blade of an electrical plug of the appliance, comprising:

a live input connectable to a live supply feeder;

a neutral input connectable to a neutral supplier feeder;

a live output connectable to the live blade of an electrical plug of an appliance;

a neutral output connectable to the neutral blade of the electrical plug of the appliance;

a relay switch electrically connected between said live and neutral inputs and said live and neutral outputs, respectively, said relay switch including a relay contact solenoid and relay contact switches operatively connected to said relay contact solenoid;

a first circuit connected to said relay switch for enabling said relay switch when live and neutral supply feeders are electrically connected to said live and neutral inputs, respectively, and when an electrical circuit across said live and neutral outputs is completed, the electrical circuit being completed when the plug of the appliance is electrically connected across said live and neutral outputs and when said appliance is in its ON condition, said first circuit comprising:

(i) a rectifier circuit connected to said live and neutral inputs, for deriving a low D.C. voltage output therefrom;

(ii) a detector circuit operating off said low D.C. voltage, for detecting whether a completed electrical circuit exists across said live and neutral outputs; and (iii) a switching circuit operating off said low D.C. voltage and responsive to said detector circuit, for enabling said relay contact solenoid when a completed electrical circuit exists across said live and neutral outputs, said switching circuit comprising a switch transistor connected in series with said relay contact solenoid across said low D.C. voltage output, said switch transistor allowing current derived from said low D.C. voltage to flow therethrough so as to energize said relay contact solenoid;

a second circuit for monitoring the current in the electrical circuit across said live and neutral outputs, and for disabling said relay switch when a current imbalance is detected in the electrical circuit.

4. The electrical safety circuit as defined in claim 3, wherein a high impedance element is connected in series between said rectifier circuit and said live and neutral inputs.

5. The electrical safety circuit as defined in claim 4, wherein said high impedance element comprises a capacitor.

6. The electrical safety circuit as defined in claim 3, wherein said detector circuit is comprised of a toroid for sensing current flow across said live and neutral outputs.

7. The electrical safety circuit as defined in claim 6, wherein said sensed current flow is initially derived from said low D.C. voltage.

8. The electrical safety circuit as defined in claim 3, wherein said first circuit further comprises a dampening circuit connected between said live input and said live output so as to initially dampen an electrical connection made by said relay switch between said live input and said live output.

9. The electrical safety circuit as defined in claim 8, wherein said dampening circuit is comprised of a dampening element connected in series with one of said relay contact switches and said live input.

10. The electrical safety circuit as defined in claim 9, wherein said dampening element comprises a fluid filled resistor.

11. The electrical safety circuit as defined in claim 9, wherein said relay contact solenoid operates by opening and closing said relay contact switches, and wherein said relay contact switch connected to said dampening circuit is closed first in order to initially dampen said electrical connection made between said live input and said live output.

12. An electrical safety circuit for electrical connection between live and neutral supply feeders and an appliance having an ON condition which establishes a completed electrical path between the live blade and the neutral blade of the plug of the appliance, comprising:

a live input connectable to a live supply feeder;

a neutral input connectable to a neutral supply feeder;

a live output connectable to the live blade of an electrical plug of an appliance;

a neutral output connectable to the neutral blade of the electrical plug of the appliance;

a relay switch electrically connected between said live and neutral inputs and said live and neutral outputs, respectively, said relay switch including a relay contact solenoid and relay contact switches operatively connected to said relay contact solenoid;

a first circuit for enabling said relay switch when live and neutral supply feeders are electrically connected to said live and neutral inputs, respectively, and when an electrical circuit across said live and neutral outputs is completed, said electrical circuit being completed when the plug of the appliance is electrically connected across said live and neutral outputs and when said appliance is in said ON condition; and a second circuit for monitoring the current in the electrical circuit across said live and neutral outputs, and for disabling said relay switch when a current imbalance is detected in the electrical circuit; said second circuit comprising:

(i) a rectifier circuit connected to said live and neutral inputs, for deriving a low D.C. voltage output therefrom;

(ii) a monitor circuit operating off said low D.C. voltage, for monitoring the current in the electrical circuit across said live and neutral outputs; and (iii) a switching circuit operating off said low D.C. voltage and responsive to said monitor circuit, for disabling said relay contact solenoid when a current imbalance is detected in the electrical circuit, said switching circuit comprising a switch transistor and an electromagnetic relay connected in series across said low D.C. voltage output, said switch transistor allowing current derived from said low D.C. voltage to flow therethrough so as to energize said electromagnetic relay.

13. The electrical safety circuit as defined in claim 12, wherein a high impedance element is connected in series between said rectifier circuit and said live and neutral inputs.

14. The electrical safety circuit as defined in claim 12, wherein said high impedance element comprises a capacitor.

15. The electrical safety circuit as defined in claim 10, wherein said monitor circuit is comprised of a toroid for sensing an imbalance in current flow through said live and neutral outputs.

16. The electrical safety circuit as defined in claim 12, wherein said electromagnetic relay is operatively connected to a first normally open contact connected in parallel across said relay contact solenoid such that the closing of said first normally open contact acts to short circuit and de-energize said relay contact solenoid, thereby disabling said relay contact solenoid.

17. The electrical safety circuit as defined in claim 12, further comprising a ground input and a ground output.

18. The electrical safety circuit as defined in claim 17, wherein said electromagnetic relay is operatively connected to a second normally open contact connected in an electrically unidirectional manner from said ground input to said neutral input, such that the closing of said second normally open contact acts to prevent circuit damage in the event of a short circuit current imbalance.

19. The electrical safety circuit as defined in claim 18, and further including a user-selectable switch is connected in series with said second normally open relay contact.

20. The electrical safety circuit as defined in claim 17, wherein said electromagnetic relay is operatively connected to a second normally open contact connected in an electrically unidirectional manner from said ground input to said live input, such that the closing of said second normally open contact acts to prevent circuit damage in the event of a short circuit current imbalance.

21. The electrical safety circuit as defined in claim 20, and further including a user-selectable switch is connected in series with said second normally open relay contact.

22. The electrical safety circuit as defined in claim 17, wherein said electromagnetic relay is operatively connected to a second normally open contact connected in an electrically unidirectional manner from said neutral input to said live input, such that the closing of said second normally open contact acts to prevent circuit damage in the event of a short circuit current imbalance.

23. The electrical safety circuit as defined in claim 22, and further including a user-selectable switch is connected in series with said second normally open relay contact.

* * * * *